United States Patent
Ma et al.

(10) Patent No.: US 10,659,727 B2
(45) Date of Patent: May 19, 2020

(54) DEVICE AND METHOD FOR TRANSMITTING VIDEO SIGNALS, AND SYSTEM FOR PLAYING VIDEO SIGNALS

(71) Applicant: BOE TECHNOLOGY GROUP CO., LTD., Beijing (CN)

(72) Inventors: Xitong Ma, Beijing (CN); Qi Zeng, Beijing (CN); Tianyue Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/991,196

(22) Filed: May 29, 2018

(65) Prior Publication Data
US 2019/0028672 A1 Jan. 24, 2019

(30) Foreign Application Priority Data
Jul. 24, 2017 (CN) .......................... 2017 1 0607659

(51) Int. Cl.
| | |
|---|---|
| H04N 7/10 | (2006.01) |
| H04N 7/01 | (2006.01) |
| H04N 7/06 | (2006.01) |
| H04N 21/4363 | (2011.01) |
| H04N 5/50 | (2006.01) |
| H04N 5/38 | (2006.01) |

(52) U.S. Cl.
CPC .............. *H04N 7/104* (2013.01); *H04N 5/38* (2013.01); *H04N 5/50* (2013.01); *H04N 7/01* (2013.01); *H04N 7/066* (2013.01); *H04N 21/43635* (2013.01)

(58) Field of Classification Search
CPC .... H04N 21/43635; H04N 7/104; H04N 7/01; H04N 7/066
See application file for complete search history.

(56) References Cited

U.S. PATENT DOCUMENTS

| | | | | |
|---|---|---|---|---|
| 6,529,680 | B1 * | 3/2003 | Broberg | H04N 5/765 348/731 |
| 2002/0026552 | A1 * | 2/2002 | Shah | H04N 7/104 710/317 |
| 2004/0189681 | A1 * | 9/2004 | Itakura | G09G 3/3648 345/698 |
| 2010/0284489 | A1 * | 11/2010 | Bae | H04L 25/0272 375/296 |
| 2011/0068911 | A1 * | 3/2011 | Nix | B60R 1/00 340/435 |

(Continued)

*Primary Examiner* — Yassin Alata
(74) *Attorney, Agent, or Firm* — Calfee, Halter & Griswold LLP (57) ABSTRACT

The present disclosure relates to a device for transmitting video signals, including: two or more signal channels respectively connected to the signal sources; two or more trigger switch units respectively disposed corresponding to the signal channels; a switch control unit configured to determine a target signal channel according to a channel selection signal, and turn on the trigger switch unit corresponding to the target signal channel and turn off the other trigger switch units; and a signal source control unit disposed at each of the signal sources, and configured to control the operation and standby of the signal source according to the turning on and turning off of the trigger switch unit of the signal channel connected to the signal source.

9 Claims, 3 Drawing Sheets

(56) References Cited

U.S. PATENT DOCUMENTS

| | | | |
|---|---|---|---|
| 2012/0023343 A1* | 1/2012 | Gupta | G06F 1/26 713/310 |
| 2016/0012001 A1* | 1/2016 | Chang | G06F 13/4022 710/316 |
| 2018/0300469 A1* | 10/2018 | Sarfraz | G06F 21/44 |

* cited by examiner

DEVICE AND METHOD FOR TRANSMITTING VIDEO SIGNALS, AND SYSTEM FOR PLAYING VIDEO SIGNALS

CROSS-REFERENCE TO RELATED APPLICATIONS

This application is based on and claim priority to Chinese Patent Application No. 201710607659.7, filed on Jul. 24, 2017, the entire contents thereof are incorporated herein by reference.

TECHNICAL FIELD

The disclosure relates to the technical field of liquid crystal display, and in particular, to a device and method for transmitting video signals, and a system for playing video signals.

BACKGROUND

Recently, digital video has become more popular, and digital video provided by multimedia sources (such as set-top boxes, DVD players, and computers) can generally be transmitted through digital interfaces to video display devices (such as televisions), for displaying the digital video received from the multimedia sources.

At present, a display device available the market generally has multiple display interfaces, through which multiple input sources often simultaneously input signals. However, the display device can display only for one specific signal source at a fixed time, thereby causing waste for other signal sources; and also increasing the power consumption of the display device.

It should be noted that the information disclosed in the above background section is only for the enhancement of understanding of the background of the present disclosure and therefore can include other information that does not form the related art that is already known to one of ordinary skill in the art.

SUMMARY

An object of the present disclosure is to provide a device and method for transmitting video signals, and a system for playing video signals, to overcome one or more problems due to limitations and disadvantages of the related art at least to some extent.

According to one aspect of the present disclosure, there is provided a device for transmitting video signals, including:

two or more signal channels respectively connected to the signal sources;

two or more trigger switch units respectively disposed corresponding to the signal channels;

a switch control unit configured to determine a target signal channel according to a channel selection signal, and turn on the trigger switch unit corresponding to the target signal channel and turn off the other trigger switch units; and a signal source control unit disposed at each of the signal sources, and configured to control the operation and standby of the signal source according to the turning on and turning off of the trigger switch unit of the signal channel connected to the signal source.

In one exemplary embodiment of the present disclosure, the signal channel includes two or more of a DisplayPort channel, a high definition multimedia channel, a digital video channel, and a video graphics array channel.

In one exemplary embodiment of the present disclosure, when the signal channel is a DisplayPort channel, a high definition multimedia channel, or a digital video channel, the trigger switch unit includes a hot plug electronic switch.

In one exemplary embodiment of the present disclosure, when the signal channel is a video graphics array channel, the trigger switch unit includes a plurality of sub-switches corresponding to the respective color channels.

In one exemplary embodiment of the present disclosure, the trigger switch unit further includes:

a plurality of impedance matching resistors respectively corresponding to the sub-switches.

In one exemplary embodiment of the present disclosure, a resistance of each of the impedance matching resistors is 75 ohms.

In one exemplary embodiment of the present disclosure, the signal source control unit includes:

a parameter acquisition unit configured to, when the trigger switch unit of the signal channel connected to the signal source at which the signal source control unit is disposed is turned on, acquire parameter information of a display connected to the signal channel; and a signal conversion unit configured to convert video signals to be transmitted according to the parameter information and transmit the converted video signals to the display via the signal channel.

In one exemplary embodiment of the present disclosure, the parameter information includes extended display identification data value information of the display.

In one exemplary embodiment of the present disclosure, the signal channel includes a signal transmission interface and a signal transmission line connecting the signal transmission interface and the signal source.

According to one aspect of the present disclosure, there is provided a system for playing video signals, including a display and the device for transmitting video signals according to any of the above.

According to one aspect of the present disclosure, there is provided a method for transmitting video signals, including:

determining a target signal channel according to a channel selection signal, turning on the trigger switch unit corresponding to the target signal channel, and turning off the other trigger switch units; and controlling the operation and standby of each signal source connected to each of the signal channels according to turning on and turning off of each of the trigger switch units corresponding to the signal channels.

In the above device for transmitting video signals of the present disclosure, by providing a switch control unit to turn on a trigger switch unit corresponding to the target signal channel and turn off the other trigger switch units, and then by providing a signal source control unit to respectively control the operation and standby of the signal sources according to the turning on and turning off of the trigger switch units of the signal channels connected to the signal sources. On the one hand, by providing a switch control unit to turn on a trigger switch unit corresponding to the target signal channel and turn off the other trigger switch units, the signal channel corresponding to the target signal channel can keep receiving from the video signal source, while the other signal channels may be in a standby state. Thus, it can solve the problem that other signal channels are always receiving from the video signal sources and can reduce the power consumption of the device for transmitting video signals. On the other hand, since the other signal channels are in a standby state, when the target signal channel is switched, the video signal source of the target signal channel after the switch may be timely switched to the display panel without significantly increasing the latency of the display.

It should be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the disclosure. Apparently, the accompanying drawings in the following description show merely some embodiments of the present disclosure, and persons of ordinary skill in the art may still derive other drawings from these accompanying drawings without creative efforts.

DETAILED DESCRIPTION

Example embodiments will now be described more fully with reference to the accompanying drawings. However, the example embodiments can be embodied in many forms and should not be construed as limited to the examples set forth herein; rather, these embodiments are provided so that this disclosure will be thorough and complete, and will fully convey the concepts of the example embodiments to those skilled in the art. The features, structures, or characteristics described herein can be combined in any suitable manner in one or more embodiments. In the following description, numerous specific details are given to provide a thorough understanding of embodiments of the present disclosure. However, those skilled in the art will recognize that one or more of the specific details may be practiced, or that other methods, components, steps, etc., may be employed without resorting to the details of the present disclosure. In other instances, well-known aspects have not been shown or described in detail to avoid obscuring aspects of the present disclosure.

Although relative terms, such as "up" and "down", are used in this specification to describe the relative relationship of one component to another component illustrated in the drawing, these terms are used herein for convenience only, and for example, according to the direction of the example illustrated in the drawing. It would be appreciated that if the device illustrated in the drawing is flipped so as to be upside down, the component referred to as "up" will be the component "down". Other relative terms, such as "high", "low", "top" and "bottom", also have similar meanings. When a structure is "on" another structure, it may mean that the structure is integrally formed on another structure, or means that the structure is "directly" disposed on another structure, or means that the structure is "indirectly" disposed on another structure.

The terms "a", "an", "the" and "said" are intended to mean that there is one or more elements/components/equivalents. The terms "comprising", "including", and "having" are intended to be open ended including and means that there may be additional elements/components/equivalents other than the listed elements/components/equivalents. The terms "first", "second" and the like are used only as a reference, not for limiting the number of the objects.

In addition, the drawings are merely schematic representations of the present disclosure and are not necessarily drawn to scale. The same reference numerals in the drawings denote the same or similar parts, and a repetitive description thereof will be omitted. Some of the block diagrams shown in the figures are functional entities and do not necessarily correspond to physically or logically separate entities. These functional entities may be implemented in software form or implemented in one or more hardware modules or integrated circuits or implemented in different networks and/or processor devices and/or microcontroller devices.

The present exemplary embodiment first provides a device for transmitting video signals. The device for transmitting video signals may include: two or more signal channels respectively connected to the signal sources.

Two or more trigger switch units are respectively disposed corresponding to the signal channels.

A switch control unit is configured to determine a target signal channel according to a channel selection signal, and turn on a trigger switch unit corresponding to the target signal channel and turn off the other trigger switch units.

A signal source control unit is disposed at each of the signal sources, and configured to control the operation and standby of the signal source according to the turning on and turning off of the trigger switch unit of the signal channel connected to the signal source.

In the above device for transmitting video signals, on the one hand, by providing a switch control unit to turn on a trigger switch unit corresponding to the target signal channel and turn off the other trigger switch units, the signal channel corresponding to the target signal channel can keep receiving from the video signal source, while the other signal channels may be in a standby state. Thus, it can solve the problem that other signal channels are always receiving from the video signal sources and can reduce the power consumption of the device for transmitting video signals. On the other hand, since the other signal channels are in a standby state, when the target signal channel is switched, the video signal source of the target signal channel after the switch may be timely switched to the display panel without significantly increasing the latency of the display.

In the following, each part included in the device for transmitting video signals in the present exemplary embodiment will be explained and explained in detail.

Figure 1:
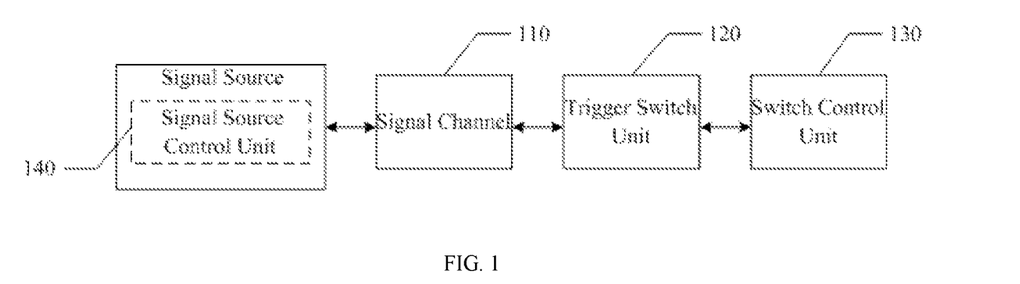
FIG. 1 schematically shows a block diagram of a device for transmitting video signals.
Figure 2:
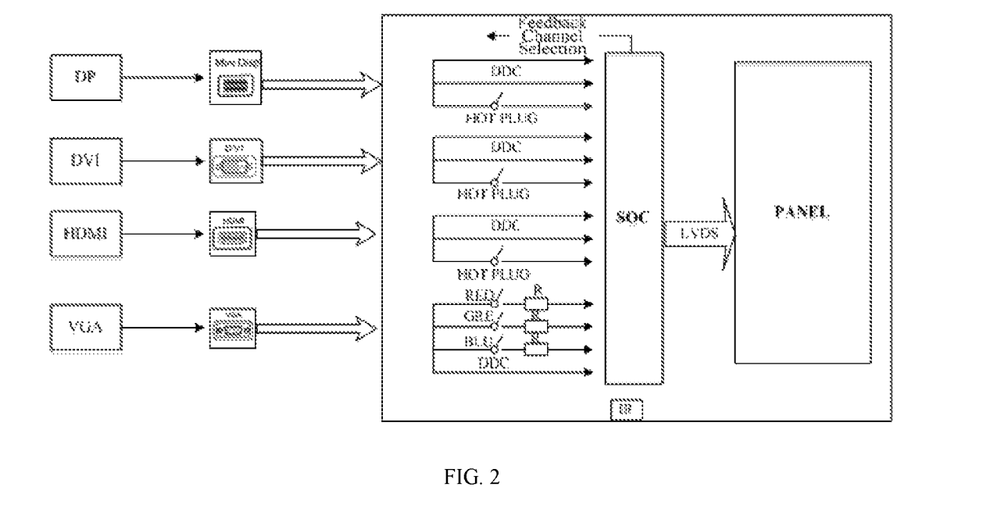
FIG. 2 schematically shows an example of a device for transmitting video signals.

Firstly, a detailed explanation and description will be given to the above signal channel. Referring to FIG. 1 and FIG. 2, two or more signal channels 110 may be respectively connected to the signal sources.

In this exemplary embodiment, as shown in FIG. 2, the above signal channel 110 may include a DisplayPort (including a DisplayPort, a Mini DisplayPort and a Micro DisplayPort, etc., which may be selected according to actual needs and is not specifically limited in this example) channel, a high-definition multimedia channel, a digital video channel and a video graphics array channel, etc., or may also include other signal channels, for example, a standard video input (RCA channel) or an S video input channel, etc. which is not is particularly limited. The DisplayPort channel (high-definition digital display interface channel) can be used to connect a computer with a display panel or connect a computer with other display device. There is no particular limitation in this example. The High Definition Multimedia Interface (HDMI) is a digital video/audio interface technology, and a dedicated digital interface for video transmission that delivers both audio and video signals simultaneously. The Digital Visual Interface (DVI) may improve the quality of the images of the PC monitors through digital transmission of images. The Video Graphics Array (VGA) may have characteristics of high resolution, fast display speed and rich colors, etc. In this example, the signal channels are respectively connected to the signal sources. The signal formats of the video signals provided by the signal sources may be the same, for example, the signal formats of the video signals may be NTSC format (PAL format or SECAM format, which is not limited by this example). The signal formats of the video signals provided by the signal sources may also be different. For example, the signal formats of the video signals are respectively two or three of the NTSC format, PAL format and SECAM format, which is not limited by the present disclosure.

Figure 3:
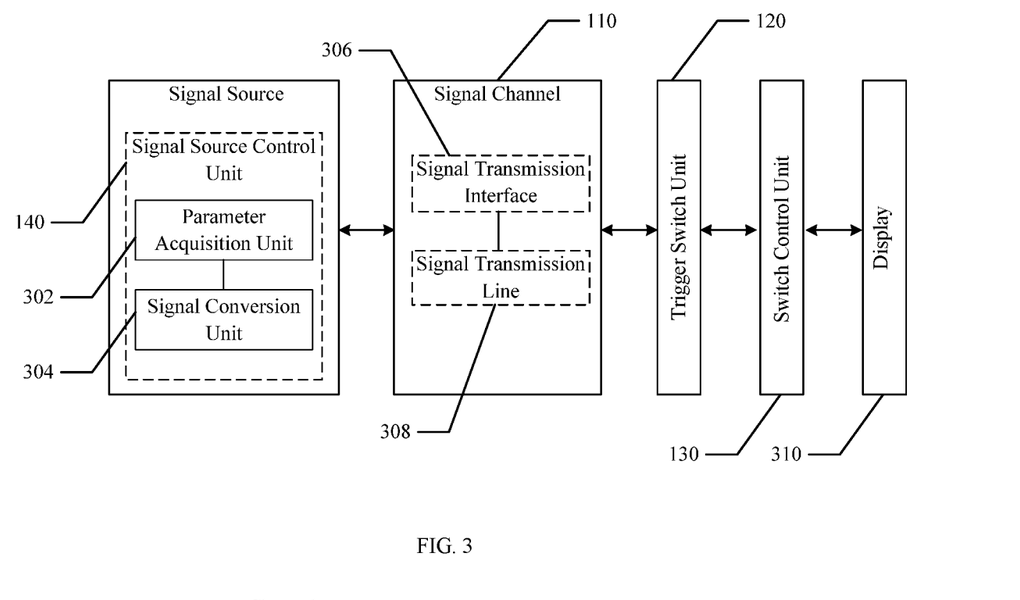
FIG. 3 schematically shows a block diagram of another device for transmitting video signals.

In an embodiment, as shown in FIG. 3, the signal channel may include a signal transmission interface 306 and a signal transmission line 308. The signal transmission interface 306 may be connected to the signal source through the signal transmission line 308.

For example, referring to FIG. 2 and FIG. 3, the signal transmission interface (refer to Mini Disp, DVI, HDMI and VGA as shown in FIG. 2) may be connected to DP, DVI, HDMI, and VGA via the signal transmission line. It should be noted herein that the signal transmission interface 306 and the signal transmission line 308 are all entities, therefore, they are not shown in FIG. 2.

Secondly, a detailed explanation and description will be given to the trigger switch unit. Referring to FIG. 2, the above trigger switch unit 120 may include a plurality of Hot Plug electronic switches or multiple sub-switches. When the signal channel is a DisplayPort channel, a high definition multimedia channel, or a digital video channel, the trigger switch unit is a Hot Plug electronic switch. When the signal channel is a video graphics array channel, the trigger switch unit is a plurality of sub-switches corresponding to R/G/B color channels in the video graphics array channel. The hot-plug or hot-swap switch may be plugged or swapped with power turned on. The hot-plug or hot-swap function may include allowing a user to remove and/or replace a damaged hard disk, power source, a card or a board or other component without shutting down the system or turning off the power, so as to improve the quick recovery capability, scalability and flexibility of the system against accidents. For example, some disk mirroring systems orienting high-end applications may be provided with hot-plugging capability for the disks. The hot plugging may be referred to as hot replacement, hot expansion, or hot upgrade, etc.

Figure 4:
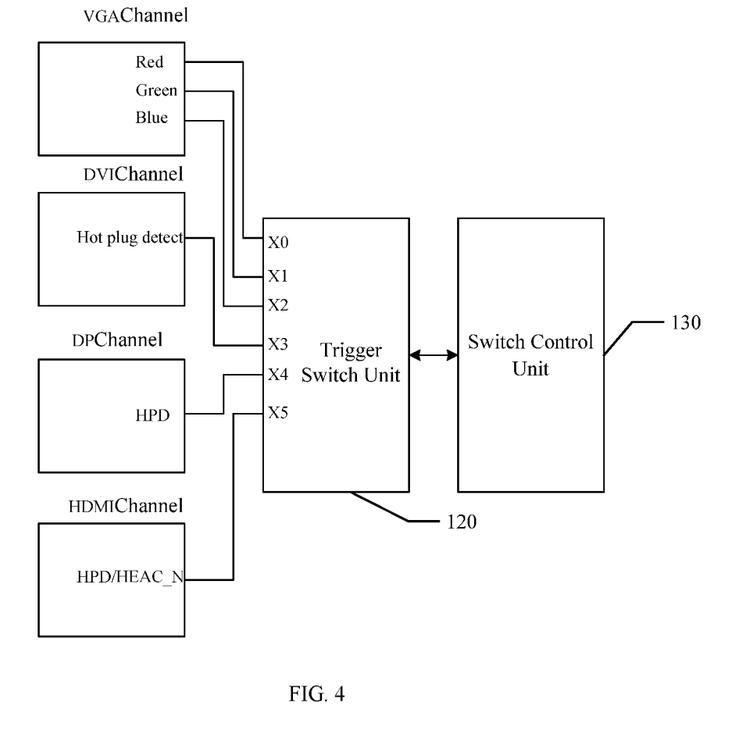
FIG. 4 schematically shows a schematic diagram of connection between a trigger switch unit and an electronic switch in each signal channel.

In an embodiment, as shown in FIG. 4, the trigger switch unit may control the signal channel to be in standby state or in operation state through the manner as shown in FIG. 4. For example, the sub-switches provided in the R/G/B color channels in the video graphics array channel may be respectively connected to the pin X0, the pin X1 and the pin X2 in the trigger switch unit. The hot plug detect in the digital video channel may be connected to the pin X3 in the trigger switch unit. The Hot plug detect (HPD) in the DisplayPort channel may be connected to the pin X4 in the trigger switch unit. The HPD/HEAC_N in the high-definition multimedia channel may be connected to pin X4 in the trigger switch unit. Therefore, when the switch control unit turns on the trigger switch unit corresponding to the target signal channel and turns off the trigger switch units corresponding to the other channels, each channel may directly determine whether the channel needs to be put into operation or standby through the HPD or the states of the sub-switches.

In an embodiment, referring to FIG. 1 and FIG. 2, when the trigger switch unit 120 is a plurality of sub-switches provided as corresponding to the R/G/B color channels in the video graphics array channel, each sub-switch is further provided with an impedance matching resistor, and the resistance of the impedance matching resistor may be 75 ohm or other resistance, for example, may be 50 ohm or 100 ohm, and the like, which is not specifically limited in the exemplary embodiment. By providing the impedance matching resistor, on one hand, it may improve the matching between the signal source and the signal line in the video graphics array channel and reduce the reflection of the signal channel; on the other hand, the steepness of the signal edge may be reduced, to reduce high-frequency noise and overshoot and so on. In an embodiment, the above impedance matching resistor may be provided as corresponding to the hot-plug electronic switches, which is not limited in the present disclosure.

Next, a detailed explanation and description will be given to the above switch control unit. As shown in FIG. 1 and FIG. 2, the switch control unit 130 may include a SOC (System on Chip) control chip, and may also include other devices having a control function, such as a microprocessor or a CPU, and the like, which is not limited in the present example. In an embodiment, the switch control unit 130 may be configured to determine a target signal channel according to the channel selection signal, turn on the trigger switch unit corresponding to the target signal channel and turn off the other trigger switch units.

For example, first, an external device (which may be a remote control, for example) is used to select a target signal channel (which may be a DisplayPort for example) and send a selection signal of the target signal channel to a signal receiving device (for example, an Infrared Radiation IR receiving device). Then, after the infrared receiving device receives the target signal channel, the target signal channel is sent to the SOC. The SOC selects a trigger switch unit corresponding to the target signal channel through a feedback channel selection module, and turns on the corresponding signal channel through the trigger switch unit corresponding to the target signal channel. Finally, when the target signal channel determined according to the channel selection signal is the DisplayPort channel, turn on the Hot Plug electronic switch corresponding to the DisplayPort channel, and then turn off the Hot Plug electronic switch corresponding to the high definition multimedia channel, the Hot Plug electronic switch corresponding to the digital video channel and the sub-switches provided as corresponding to the R/G/B color channels in video graphics array channel.

Then, a detailed explanation and description will be given to the above signal source control unit. Referring to FIG. 1 and FIG. 2, the above signal source control unit 140 may be disposed at each signal source, and the signal source control unit may be configured to control the operation and standby of the signal source according to the turning on and turning off of the trigger switch unit of the signal channel connected to the signal source.

For example, when the Hot Plug electronic switch corresponding to the DisplayPort channel is in the turned on state and the Hot Plug electronic switch corresponding to the high definition multimedia channel, the Hot Plug electronic switch corresponding to the digital video channel and the sub-switches provided as corresponding to the R/G/B color channels in video graphics array channel are in the turned off state, the signal source corresponding to the DisplayPort channel is controlled to be in the operation state, and the signal sources respectively corresponding to the digital video channel, the high definition multimedia channel, the video graphics array channel are controlled to be in the turned off states.

When the Hot Plug electronic switch corresponding to the high definition multimedia channel is in the turned on state and the Hot Plug electronic switch corresponding to the DisplayPort channel, the Hot Plug electronic switch corresponding to the digital video channel and the sub-switches provided as corresponding to the R/G/B color channels in video graphics array channel are in the turned off state, the signal source corresponding to the high definition multimedia channel is controlled to be in the operation state, and the signal sources respectively corresponding to the digital video channel, the DisplayPort channel, the video graphics array channel are controlled to be in the turned off states.

When the Hot Plug electronic switch corresponding to the digital video channel is in the turned on state and the Hot Plug electronic switch corresponding to the high definition multimedia channel, the Hot Plug electronic switch corresponding to the DisplayPort channel, and the sub-switches provided as corresponding to the R/G/B color channels in video graphics array channel are in the turned off state, the signal source corresponding to the digital video channel is controlled to be in the operation state, and the signal sources respectively corresponding to the DisplayPort channel, the high definition multimedia channel, the video graphics array channel are controlled to be in the turned off states.

When the sub-switches provided as corresponding to the R/G/B color channels in video graphics array channel are in the turned on state and the Hot Plug electronic switch corresponding to the high definition multimedia channel, the Hot Plug electronic switch corresponding to the digital video channel, and the Hot Plug electronic switch corresponding to the DisplayPort channel are in the turned off state, the signal source corresponding to the video graphics array channel is controlled to be in the operation state, and the signal sources respectively corresponding to the digital video channel, the DisplayPort channel, and the high definition multimedia channel are controlled to be in the turned off states.

In an embodiment, with continued reference to FIG. 3, the signal source control unit 140 may further include a parameter acquisition unit 302 and a signal conversion unit 304. The parameter acquisition unit 302 may be configured to, when the trigger switch unit of the signal channel 110 connected to the signal source at which the signal source control unit 140 is disposed is turned on, acquire parameter information of a display connected to the signal channel. The signal conversion unit may be configured to convert video signals to be transmitted according to the parameter information and transmit the converted video signals to the display via the signal channel.

Specifically, when the Hot Plug electronic switch corresponding to the DisplayPort signal channel is in the turned on state, the parameter acquisition unit acquires parameter information of the display connected to the DisplayPort signal channel. The parameter information may be Extended Display Identification Data (EDID), which is a VESA standard data format that can include parameters on the monitor and its performance such as vendor information, maximum image size, color settings, manufacturer settings, limits on frequency range, name of the display and serial numbers and so on. When the EDID information is acquired, the signal conversion unit converts the video signals to be transmitted which are received through the DisplayPort signal channel, to a format that the display can support according to the EDID information. Then, the converted video signals are transmitted to the display to be displayed through the DisplayPort signal channel. The signal conversion unit may be a direct digital control circuit (DDC) or other modules with a conversion function, which is not limited in this example. By providing a parameter acquisition unit to acquire the parameter information of the display, and a conversion module to convert video signals to be transmitted to a format supported by the display according to the parameter information, it can realize that the video signals outputted is in a format that may be supported by the display, and can avoid a problem that the video signals cannot be outputted due to hot plug or unconnected display or a problem that the system needs to be restarted due to wrong display configuration.

In the following, the DDC circuit described above is further explained. The DDC circuit may also include EDID identification, storage, chroma space conversion and other circuit module. The DDC circuit is a key component of the system to achieve control functions. The working process is that the DDC circuit acquiring data from video signal source in real time through an analog input channel (AI) and a digital input channel (DI), converting analog signals into digital signals acceptable by a computer (A/D conversion), then performing operation according to a certain control rule, finally, issuing a control signal and converting the digital signals to analog signals (D/A conversion), to directly control the display panel to operate through an analog output channel (AO) and a digital output channel (DO).

In addition, in order to reduce the power consumption of the device for transmitting video signals. The device for transmitting video signals may further include a low-voltage differential signal unit disposed between the switch control unit and the display and configured to perform noise reduction processing on the converted video signals. As shown in FIG. 2, the low-voltage differential signal unit (Low-Voltage Differential Signaling, LVDS) may be configured to disposed between the SOC control chip and the display panel (Panel), and configured to perform noise reduction processing on the converted video signals and received by the DisplayPort signal channel. By providing the low-voltage differential signal unit, it can reduce the power consumption, and can also have advantages of differential transmission.

Figure 5:
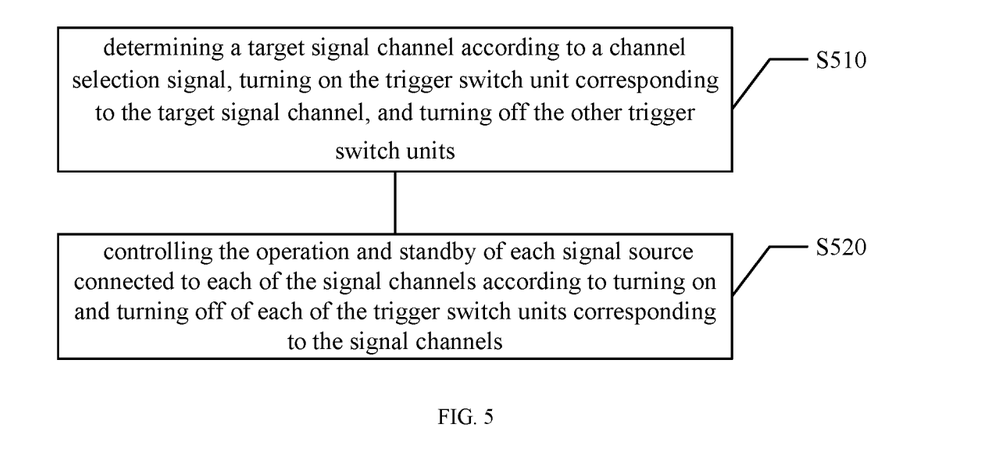
FIG. 5 schematically shows a flowchart of a method for transmitting video signals.

The present disclosure also provides a method for transmitting video signals based on the device for transmitting video signals described above. Referring to FIG. 5, the method for transmitting video signals may include steps S510-S520.

In step S510, a target signal channel is determined according to a channel selection signal, and the trigger switch unit corresponding to the target signal channel is turned on and the other trigger switch units are turned off.

In step S520, the operation and standby of each signal source connected to each of the signal channels are controlled according to turning on and turning off of each of the trigger switch units corresponding to the signal channels.

Referring to FIG. 2 and FIG. 3 below, a detailed explanation of the above method for transmitting video signals is provided. It should be appreciated that the details are provided to facilitate understanding of the present disclosure, which are exemplary, and should not be construed as any limitation to the scope of the present disclosure.

In step 1, the power of the display 310 is turned on, an external device (which may be a remote control, for example) is used to select a target signal channel (which may be a DisplayPort for example) and send the target signal channel to a signal receiving device (for example, an Infrared Radiation IR receiving device).

In step 2, after the infrared receiving device receives the target signal channel, the target signal channel is sent to the SOC. The SOC selects a trigger switch unit corresponding to the target signal channel through a feedback channel selection module, turns on the corresponding signal channel (for example, the DisplayPort channel) through the trigger switch unit (for example, the Hot Plug corresponding to the DisplayPort channel) corresponding to the target signal channel, and turns off the electronic switches (for example, the Hot Plug corresponding to the HDMI, the Hot Plug corresponding to the DVI and the R/G/B sub-switches corresponding to the VGA, etc.) corresponding to the other signal channels (for example, the HDMI channel, the DVI channel and the VAG channel, etc.).

In step 3, when the trigger switch unit corresponding to the signal channel corresponding to the target signal channel is turned on, parameter information (for example, the EDID, Extended Display Identification Data, which may include vendor ID, product ID, serial number, date of manufacture, EDID version, voltage rating of the display, maximum height and width, color characteristics of the display, time sequence of the display, timing and resolution of the display, the data format of the video source supported by the display, etc.) of the above display panel is acquired through the signal source control unit (for example, the DDC control circuit) corresponding to the signal channel.

In step 4, the DDC control circuit converts the data format of the video signals received through the above signal channel to a data format supported by the display panel according to the parameter information, and displays the video signals on the above display panel after performing noise reduction processing through the low-voltage differential signal module.

In addition, while the various steps of the methods of the disclosure are described in the drawings in a particular order, this does not require or imply that the steps must be performed in that particular order, or that all of the illustrated steps be performed in order to achieve the desired result. Additionally or alternatively, certain steps may be omitted, steps may be combined into one step, and/or one step may be broken down into multiple steps.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

What is claimed is:

1. A device for transmitting video signals, comprising:
   two or more signal channels respectively connected to input signal sources, wherein the signal channel comprises two or more of a DisplayPort channel, a high definition multimedia channel, a digital video channel, and a video graphics array channel;
   two or more trigger switch units respectively disposed corresponding to the signal channels, wherein when the signal channel is the DisplayPort channel, the high definition multimedia channel, or the digital video channel, the trigger switch unit comprises a hot plug electronic switch, and when the signal channel is the video graphics array channel, the trigger switch unit comprises a plurality of sub-switches corresponding to the respective color channels;
   a switch control unit configured to determine a target signal channel according to a channel selection signal, and to turn on the trigger switch unit corresponding to the target signal channel and to turn off the other trigger switch units, wherein, when the switch control unit turns on the trigger switch unit corresponding to the target signal channel and turns off the other trigger switch units corresponding to the other signal channels, each of the signal channel directly determines whether the signal channel needs to be put into operation or standby through a hot plug detection of the hot plug electronic switch or through states of the sub-switches; and
   a signal source control unit disposed at each of the input signal sources, and configured to control the operation and standby of the input signal source according to the turning on and turning off of the trigger switch unit of the signal channel connected to the input signal source, wherein the signal source control unit is configured to control the input signal source to be in the operation when the input signal source receives a signal that the trigger switch unit is the turning on, and to control the input signal source to be in the standby when the input signal source receives a signal that the trigger switch unit is the turning off, so as to reduce power consumption.

2. The device for transmitting video signals according to claim 1, wherein the trigger switch unit further comprises:
   a plurality of impedance matching resistors respectively corresponding to the sub-switches.

3. The device for transmitting video signals according to claim 2, wherein a resistance of each of the impedance matching resistors is 75 ohms.

4. The device for transmitting video signals according to claim 1, wherein the signal source control unit comprises:
   a parameter acquisition unit configured to, when the trigger switch unit of the signal channel connected to the input signal source at which the signal source control unit is disposed is turned on, acquire parameter information of a display connected to the signal channel; and
   a signal conversion unit configured to convert video signals to be transmitted according to the parameter information and to transmit the converted video signals to the display via the signal channel.

5. The device for transmitting video signals according to claim 4, wherein the parameter information comprises extended display identification data value information of the display.

6. The device for transmitting video signals according to claim 1, wherein the signal channel comprises a signal transmission interface and a signal transmission line connecting the signal transmission interface and the input signal source.

7. A system for playing video signals, comprising a display and the device for transmitting video signals, the device for transmitting video signals comprising:
   two or more signal channels respectively connected to input signal sources, wherein the signal channel comprises two or more of a DisplayPort channel, a high definition multimedia channel, a digital video channel, and a video graphics array channel;

two or more trigger switch units respectively disposed corresponding to the signal channels, wherein when the signal channel is the DisplayPort channel, the high definition multimedia channel, or the digital video channel, the trigger switch unit comprises a hot plug electronic switch, and when the signal channel is the video graphics array channel, the trigger switch unit comprises a plurality of sub-switches corresponding to the respective color channels;

a switch control unit configured to determine a target signal channel according to a channel selection signal, and to turn on the trigger switch unit corresponding to the target signal channel and to turn off the other trigger switch units, wherein, when the switch control unit turns on the trigger switch unit corresponding to the target signal channel and turns off the other trigger switch units corresponding to the other signal channels, each of the signal channel directly determines whether the signal channel needs to be put into operation or standby through a hot plug detection of the hot plug electronic switch or through states of the sub-switches; and a signal source control unit disposed at each of the input signal sources, and configured to control the operation and standby of the input signal source according to the turning on and turning off of the trigger switch unit of the signal channel connected to the input signal source, wherein the signal source control unit is configured to control the input signal source to be in the operation when the input signal source receives a signal that the trigger switch unit is the turning on, and to control the input signal source to be in the standby when the input signal source receives a signal that the trigger switch unit is the turning off, so as to reduce power consumption.

8. A method for transmitting video signals for a device for transmitting video signals, wherein the device for transmitting video signals, comprises: two or more signal channels respectively connected to input signal sources, wherein the signal channel comprises two or more of a DisplayPort channel, a high definition multimedia channel, a digital video channel, and a video graphics array channel; two or more trigger switch units respectively disposed corresponding to the signal channels, wherein when the signal channel is the DisplayPort channel, the high definition multimedia channel, or the digital video channel, the trigger switch unit comprises a hot plug electronic switch, and when the signal channel is the video graphics array channel, the trigger switch unit comprises a plurality of sub-switches corresponding to the respective color channels; a switch control unit configured to determine a target signal channel according to a channel selection signal, and to turn on the trigger switch unit corresponding to the target signal channel and to turn off the other trigger switch units, wherein, when the switch control unit turns on the trigger switch unit corresponding to the target signal channel and turns off the other trigger switch units corresponding to the other signal channels, each of the signal channel directly determines whether the signal channel needs to be put into operation or standby through a hot plug detection of the hot plug electronic switch or through states of the sub-switches; and a signal source control unit disposed at each of the input signal sources, and configured to control the operation and standby of the input signal source according to the turning on and turning off of the trigger switch unit of the signal channel connected to the input signal source, wherein the signal source control unit is configured to control the input signal source to be in the operation when the input signal source receives a signal that the trigger switch unit is the turning on, and to control the input signal source to be in the standby when the input signal source receives a signal that the trigger switch unit is the turning off, so as to reduce power consumption, and the method comprises:

determining a target signal channel according to a channel selection signal, turning on the trigger switch unit corresponding to the target signal channel, and turning off the other trigger switch units; and controlling the operation and standby of each input signal source connected to each of the signal channels according to turning on and turning off of each of the trigger switch units corresponding to the signal channels.

9. The method for transmitting video signals according to claim 8, further comprising:

when the trigger switch unit of the signal channel connected to the input signal source at which the signal source control unit is disposed is turned on, acquiring parameter information of a display connected to the signal channel by a parameter acquisition unit in the signal source control unit; and converting video signals to be transmitted according to the parameter information and transmit the converted video signals to the display via the signal channel by a signal conversion unit in the signal source control unit.

* * * * *